Feb. 11, 1941.  L. VERGUSON  2,231,777

TRANSMISSION

Filed June 23, 1939  2 Sheets-Sheet 1

INVENTOR
LEO VERGUSON
BY
Beau, Brooks, Buckley & Beau.
ATTORNEYS

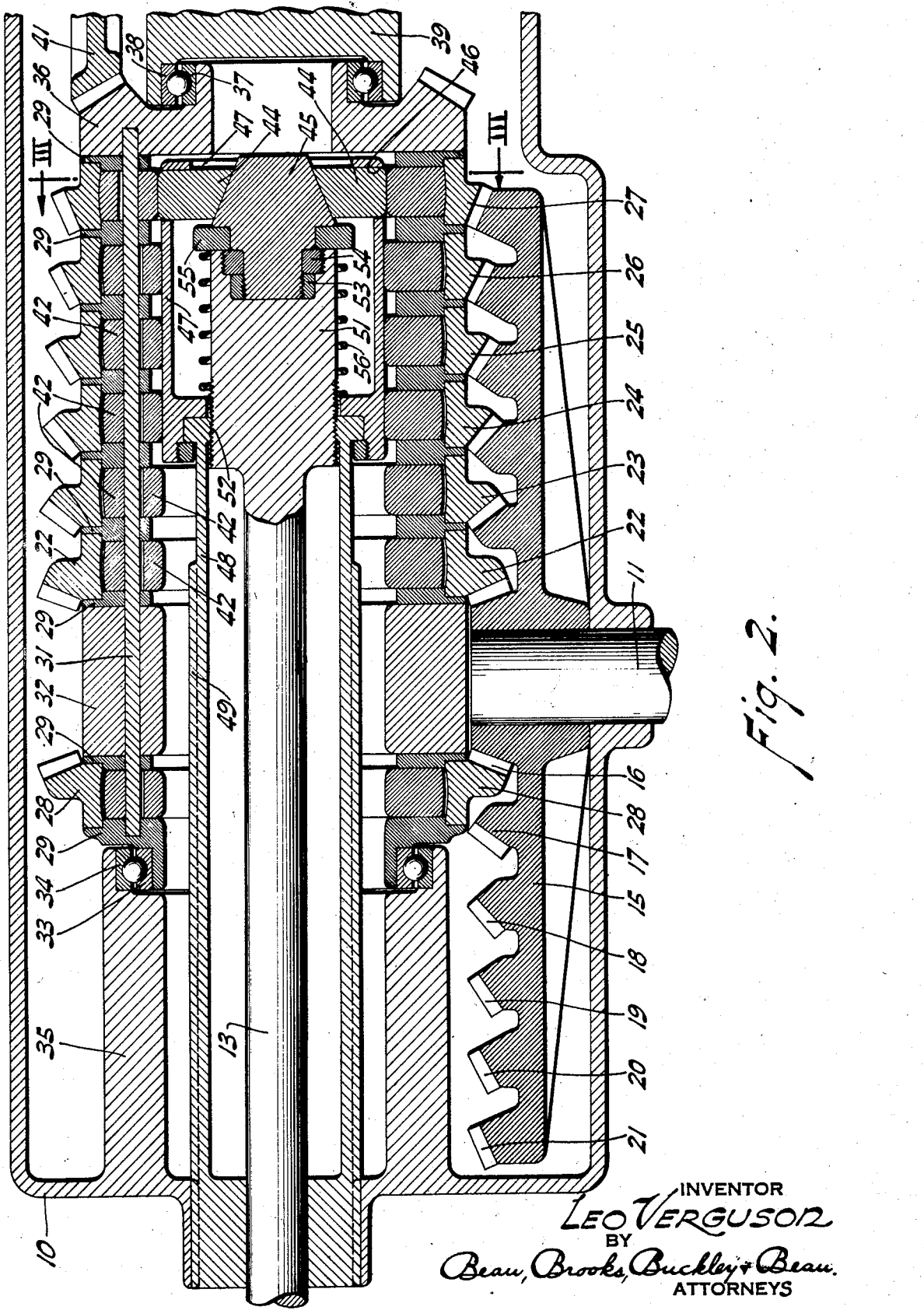

Patented Feb. 11, 1941

2,231,777

UNITED STATES PATENT OFFICE 2,231,777

TRANSMISSION

Leo Verguson, Windsor, N. Y.

Application June 23, 1939, Serial No. 280,751

5 Claims. (Cl. 192—48)

The present invention relates to multiple speed transmissions, and has particular relation to such transmissions wherein a plurality of sets of gears are constantly in mesh and the selected speed ratio is obtained by clutching a gear of the selected set.

According to the present invention a plurality of gears are arranged in tandem for rotation about a common axis, each gear having associated therewith friction clutch shoes, the clutch shoes of all gears rotating as a unit about the common axis of the gears, and a clutch operating device is arranged to be moved into operative relation to the clutch shoes of any of said gears and to be operated to cause the selected shoes to engage and rotate as a unit with the associated gear.

These and other objects and advantages, including the novel arrangement and combination of parts of the clutch operating mechanism, will become apparent from the following description of the typical embodiment of the invention shown in the accompanying drawings, wherein:

Fig. 2 is a plan sectional view drawn to a larger scale than Fig. 1; and,

Figure 1:
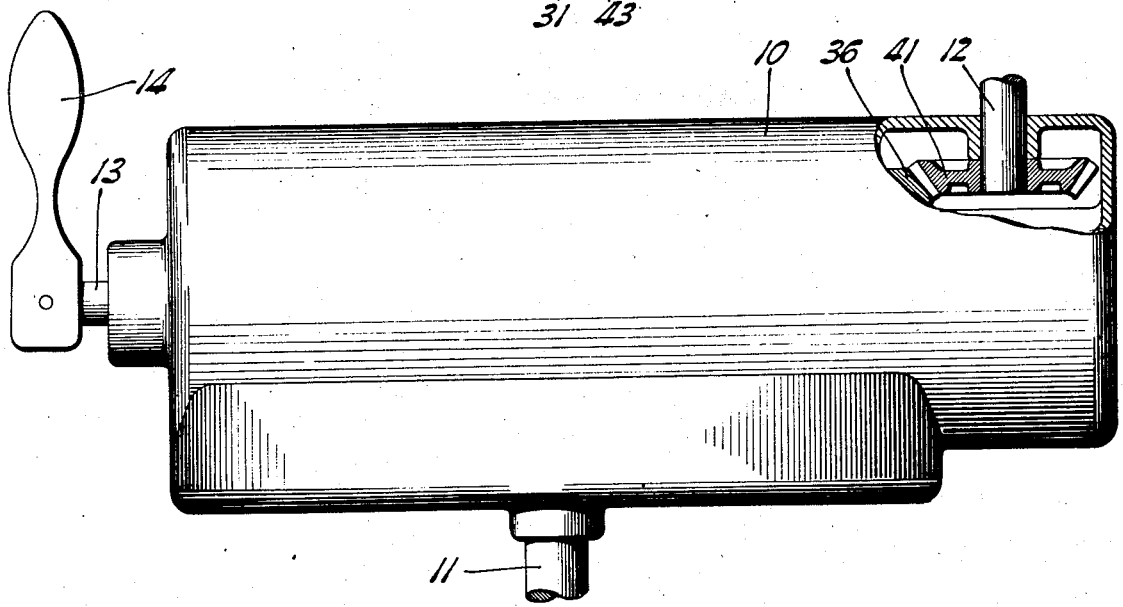
Fig. 1 is a plan view of the transmission with a portion of the casing thereof broken away.

As shown in Fig. 1, the transmission includes a casing or housing 10 in which shafts 11 and 12 are journaled for rotation, and also includes an operating rod 13 with a handle 14 for actuating the mechanism within the housing to vary the gear ratio between the shafts 11 and 12.

As shown in Fig. 2, a gear wheel 15 is secured to the shaft 11 within the casing, the gear having a plurality of sets of beveled gear teeth formed thereon. While any desired number of such sets of beveled gear teeth may be employed, there are six sets in the embodiment illustrated, of which set 16 is of smallest diameter and contains the smallest number of teeth, and set 21 is of largest diameter and contains the largest number of teeth, the intermediate sets being 17, 18, 19 and 20.

Constantly meshed with the sets of gear teeth 16 to 21 inclusive are, respectively, beveled ring gears 22, 23, 24, 25, 26 and 27; and also engaging with set 16, but on the opposite side thereof from gear 22, is a beveled ring gear 28. All of the gears 22 to 28 inclusive are mounted for rotation, about a common axis, upon annular shoulders formed on spaced rings 29.

The rings 29 are connected by a plurality of bars 31 which extend through the rings, forming therewith a cage-like structure. The latter includes an annular member 32 located between the rings 29 that are adjacent and between gears 22 and 28, the bars 31 also passing through the annular member.

Ring 29 at the end of bars 31 adjacent gear 28 is provided with a shoulder engaging the inner race 33 of an anti-friction bearing, the outer race 34 of the bearing being supported by a tubular extension 35 of the casing 10. At the other end of the cage-like structure, the bars 31 are secured to a beveled gear 36 having a shoulder engaging the inner race 37 of another anti-friction bearing whose outer race 38 is supported by an extension 39 of casing 10. Gear 36 meshes with a bevel gear 41 secured to shaft 12.

Carried by the bars 31 between rings 29 are clutch shoes 42 arranged in sets (three shoes to each set on the illustrated embodiment), each shoe having recesses 43 receiving the bars. Preferably the side walls of the recesses and bars are so arranged that each shoe is guided for limited radial movement toward or away from the inner surface of the adjacent one of ring gears 22 to 28 inclusive.

Disposed within the inner peripheries of the shoes 42 is a set of parts 44 whose outer surfaces are substantially concentric with the inner surfaces of the shoes, and whose inner surfaces fit a cone 45 which is disposed concentrically with respect to the ring gears, shoes 42, and the set of parts 44. The latter parts extend through openings 46 in a cup-shaped member 47 which is mounted for rotation, co-axial with the ring gears, upon a tubular member 48. This tubular member is received in guided relation in an opening through the casing 10, for axial movement effected by the operator's moving handle 14 longitudinally to bring the parts 44 into adjacency with any selected set of clutch shoes 42; and the member 48 has suitable keys 49 formed thereon and cooperating with the opening through the casing to prevent it from rotating.

The cone 45 is mounted for rotation upon an enlarged end portion 51 of the control rod 13, which portion 51 is screw threaded, as indicated at 52, to the tubular member 48, the screw thread preferably being of relatively steep pitch. In order to secure the cone to portion 51 it may have a ring 53 secured to the end thereof, and portion 51 may have secured thereto a ring 54 providing a shoulder preventing axial displacement of ring 53 and the cone. Preferably a washer 55 is disposed between the cone and portion 51, and a heavy compression spring 56 is disposed between the washer and an internal flange on member 47.

Figure 3:
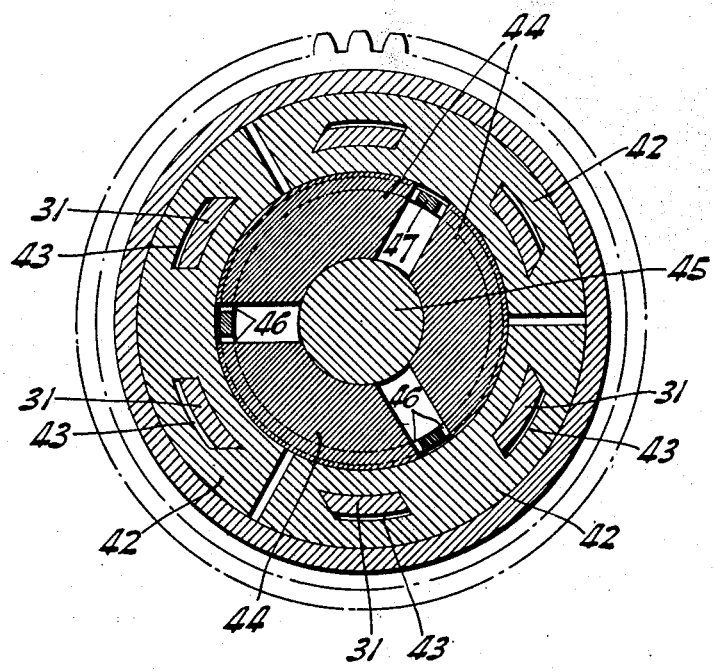
Fig. 3 is a sectional view taken along line 3—3 of Fig. 2.

In the position of the parts shown in Figs. 2 and 3, the clutch shoes 42 adjacent ring gear 27 are pressed into friction clutching relation with the gear by parts 44 which in turn are maintained in radially expanded relation by cone 45 backed by spring 56. Accordingly, gear 27 is clutched to the cage-like assembly including bars 31, rings 29, and gear 36 with the result that the drive between shafts 11 and 12 is between the outer set of gear teeth 21 on wheel 15 and ring gear 27 and between gear 36 (which now rotates as a unit with gear 27) and gear 41. The other ring gears will merely rotate idly.

If it is now desired to change the gear ratio of the transmission, the handle 14 may be partially rotated, screwing portion 51 into a retracted position with respect to tubular member 48, and thereby retracting the cone 45 and allowing parts 44 to contract radially sufficiently to release clutch shoes 42 from gear 27. Thereupon the handle 14 may be shifted longitudinally to position parts 44 adjacent the clutch shoes 42 of any other ring gear which the operator may select. Upon release of the handle the spring 56 will cause the cone 45 to move forwardly relative to member 47, expanding parts 44 and engaging the clutch shoes with the selected ring gear, so that the transmission drive will be therethrough.

It will be understood that the ring gear 28 rotates in the opposite direcion from the other ring gears, so that when the drive is through it, a reverse drive is effected.

It will be understood further that the device herein shown anad described is merely illustrative of the inventive principles involved, and that these principles may be otherwise embodied without departing from the spirit of the invention or the scope of the appended claims.

I claim:

1. In a transmission, a member having a plurality of sets of clutch elements arranged therealong and rotatable therewith, each of said sets comprising a plurality of circularly arranged radially expansible friction clutch elements, a plurality of drive elements arranged for independent concentric rotation relative to said member and clutch elements, each drive member being frictionally engageable by one set of clutch elements upon radial expansion of the latter, and an actuator axially movable relative to said elements and operable to expand a selected set of clutch elements into frictional engagement with a drive element, said actuator including a plurality of radially movable parts engageable with all of the plural elements of the selected set of clutch elements and a cone movable axially relative to said radially movable parts.

2. In a transmission, a plurality of sets of radially expansible clutch elements arranged for co-axial rotation, the several clutch elements of each set each being circularly arranged and movable radially to vary the effective diameter of the set; an expander movable axially into operative relation within a selected set of said clutch elements, said expander including a plurality of circularly arranged expander parts and adapted to rotate as a unit within a set of clutch elements, a member supporting said parts for radial movement to vary the effective diameter thereof, and means movable axially relative to said member for expanding said parts thereby expanding said clutch elements.

3. In a transmission, a casing, a plurality of sets of radially expansible clutch elements arranged in said casing for co-axial rotation, a plurality of circularly arranged parts movable radially to expand one set of said clutch elements and a support for said parts, a member on which said support is rotatable, said member being movable relative to the casing to position said parts adjacent any one of said sets of clutch elements, a second member screw threaded to the first mentioned member, and a cone mounted for rotation on said second member and effective upon relative screw action of said members for moving said parts radially.

4. In a transmission, a casing, a plurality of sets of radially expansible clutch elements arranged in said casing for co-axial rotation, a plurality of circularly arranged parts movable radially to expand one set of said clutch elements and a support for said parts, a member on which the support is rotatable, said member being movable relative to the casing to position said parts adjacent any one of said sets of clutch elements, a cone engageable with said parts and means for moving the cone relative to said member to move said parts radially and thereby expand the adjacent set of clutch elements.

5. In a transmission, a plurality of drive elements arranged for rotation about a common axis, each of said drive elements having an inner peripheral portion adapted to be engaged by clutch elements and a marginal portion adapted to support the drive element for rotation, a supporting unit for said drive elements comprising bearing portions rotatably engaged by said marginal portions of the drive elements, a plurality of radially movable friction clutch elements engageable with the inner peripheral portion of each drive element, and guide means associated with said supporting unit and said friction clutch elements supporting the latter for radial movement into friction clutch engagement with the inner peripheral portions of the drive elements.

LEO VERGUSON.